(12) United States Patent
Wilmot

(10) Patent No.: US 9,346,108 B2
(45) Date of Patent: May 24, 2016

(54) STATOR MANUFACTURING METHOD AND WHIRLING CUTTER DEVICE

(75) Inventor: Wessley Wilmot, Derbyshire (GB)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 731 days.

(21) Appl. No.: 13/576,517

(22) PCT Filed: Feb. 4, 2011

(86) PCT No.: PCT/GB2011/050200
§ 371 (c)(1),
(2), (4) Date: Aug. 1, 2012

(87) PCT Pub. No.: WO2011/095823
PCT Pub. Date: Aug. 11, 2011

(65) Prior Publication Data
US 2012/0294687 A1    Nov. 22, 2012

(30) Foreign Application Priority Data

Feb. 4, 2010 (GB) .................................. 1001836.4

(51) Int. Cl.
*B23C 3/02*    (2006.01)
*B23C 3/32*    (2006.01)
(Continued)

(52) U.S. Cl.
CPC . *B23C 3/32* (2013.01); *B23C 9/005* (2013.01); *B23Q 5/046* (2013.01); *Y10T 409/303752* (2015.01); *Y10T 409/303808* (2015.01); *Y10T 409/304424* (2015.01)

(58) Field of Classification Search
CPC ........... Y10T 409/300056; Y10T 409/300112; Y10T 409/300392; Y10T 409/300504; Y10T 409/30056; Y10T 409/300616; Y10T 409/300672; Y10T 409/300728; Y10T 409/300784; Y10T 409/307616; Y10T 409/30756; Y10T 709/303752; Y10T 409/303808; Y10T 409/304424; B23C 2215/00; B23C 2220/24; B23C 2220/363; B23C 2220/56; B23C 2220/68; B23C 2270/025; B23C 2270/18

USPC ............. 409/65, 66, 71, 73, 74–78, 200, 199, 409/131, 132, 143
See application file for complete search history.

(56) References Cited

U.S. PATENT DOCUMENTS 1,507,235 A * 9/1924 Hall ................................ 409/66
3,727,494 A * 4/1973 Rohs .............................. 82/124
(Continued)

FOREIGN PATENT DOCUMENTS

CN    101147989 A    3/2008
CN    201186361 Y    1/2009
(Continued)

OTHER PUBLICATIONS

Chinese Office Action dated Feb. 21, 2014; Chinese Application No. 2011800008013.8 (6 p.).
(Continued)

*Primary Examiner* — Daniel Howell
*Assistant Examiner* — Nicole N Ramos
(74) *Attorney, Agent, or Firm* — Conley Rose, P.C.

(57) ABSTRACT

A method for machining a helical bore of a stator comprises providing a stator body with a bore. In addition, the method comprises providing a first and a second machining device. The first machining device comprises a milling head coupled to the end of a shaft and a rotary cutter mounted to the milling head for rotation about an axis transverse to the longitudinal axis. The second machining device comprises a whirling head on the end of a shaft and a whirling cutter mounted to the whirling head for rotation about an axis parallel to the longitudinal axis but offset therefrom by a selectively variable degree. Further, the method comprises driving the first machining device through the bore multiple times with the rotary cutter following a helical path. Still further, the method comprises driving the second machining device through the bore with the whirling cutter following the same helical path.

8 Claims, 14 Drawing Sheets

(51) Int. Cl.
  *B23C 9/00* (2006.01)
  *B23Q 5/04* (2006.01)

(56) References Cited

U.S. PATENT DOCUMENTS

| | | | | |
|---|---|---|---|---|
| 4,016,801 | A | * | 4/1977 | Ditson .............................. 409/66 |
| 4,606,683 | A | * | 8/1986 | Link et al. ........................ 409/66 |
| 4,715,751 | A | | 12/1987 | Rigoulot |
| 4,813,828 | A | | 3/1989 | Beck et al. |
| 5,150,518 | A | | 9/1992 | Fuchs |
| 5,184,927 | A | | 2/1993 | Judy |
| 5,238,337 | A | * | 8/1993 | Nussbaumer et al. ......... 409/132 |
| 6,644,358 | B2 | * | 11/2003 | Demarest et al. .............. 138/177 |
| 7,520,705 | B2 | * | 4/2009 | Degesne ........................ 409/259 |
| 9,044,814 | B2 | * | 6/2015 | Wilmot |
| 2003/0102139 | A1 | | 6/2003 | Debat et al. |
| 2005/0079083 | A1 | * | 4/2005 | Lievestro et al. ............... 418/48 |
| 2008/0131224 | A1 | * | 6/2008 | Vouillamoz ..................... 409/74 |

FOREIGN PATENT DOCUMENTS

| | | |
|---|---|---|
| DE | 3843951 A1 * | 6/1990 |
| GB | 1265743 A | 3/1972 |
| WO | 2008/129237 A1 | 10/2008 |
| WO | 2010/049724 A2 | 5/2010 |

OTHER PUBLICATIONS

English Translation of Chinese Office Action dated Feb. 21, 2014; Chinese Application No. 2011800008013.8 (6 p.).
English Translation of Chinese Search Report dated Feb. 12, 2014; Chinese Application No. 2011800008013.8 (2 p.).
Search Report for GB Application No. 1001836.4 dated Jun. 9, 2010 (3 p.).
PCT/GB2011/050200 International Search Report dated May 4, 2011 (7 p.).
Canadian Office Action dated Feb. 15, 2016, for Canadian Application No. 2,787,117 (3 p.).

* cited by examiner

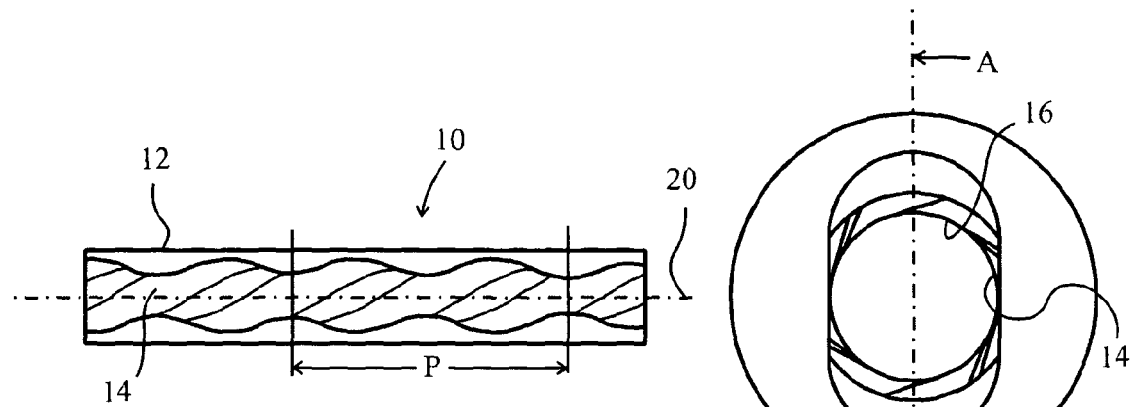
Fig. 1a
Fig. 1b
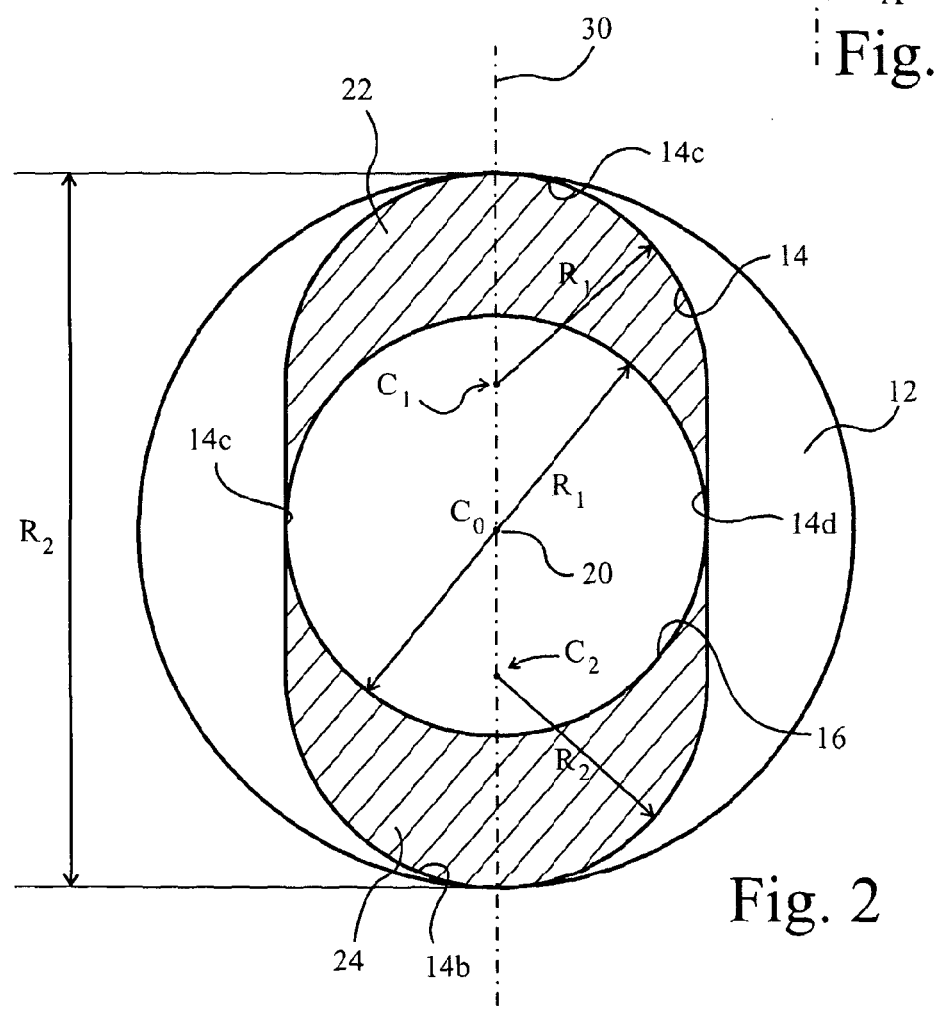
Fig. 2

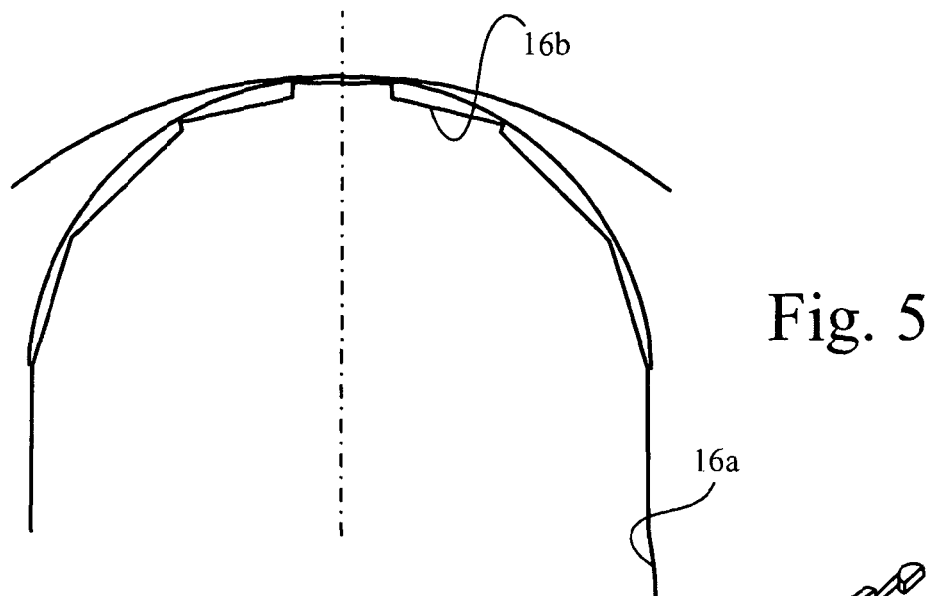
Fig. 5
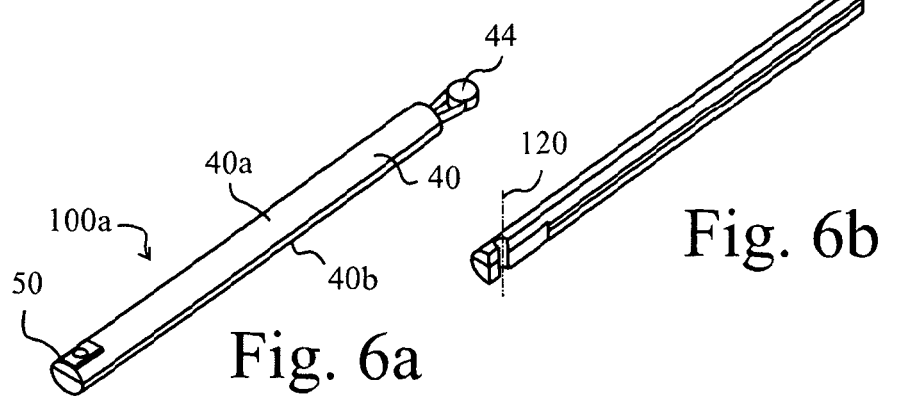
Fig. 6a
Fig. 6b
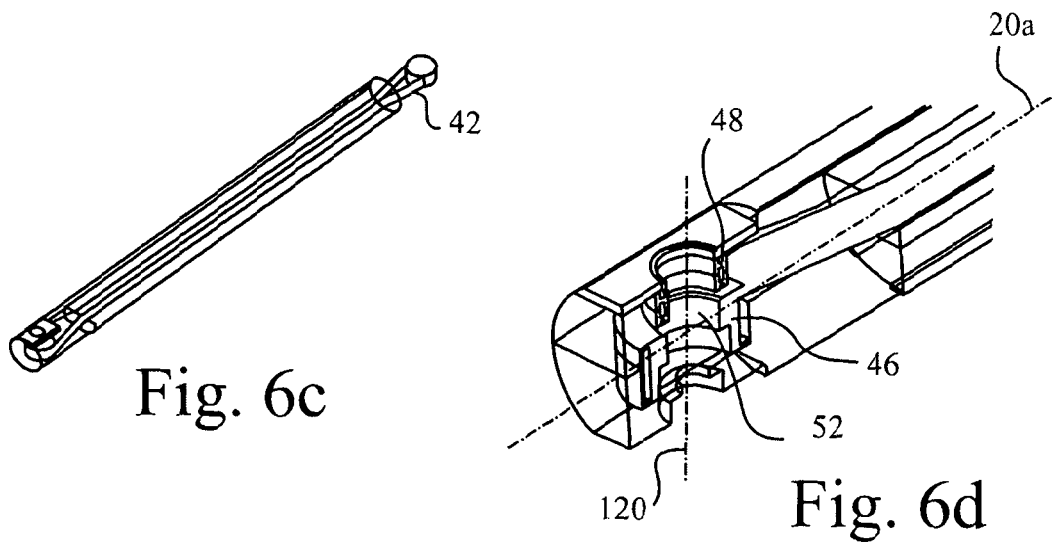
Fig. 6c
Fig. 6d

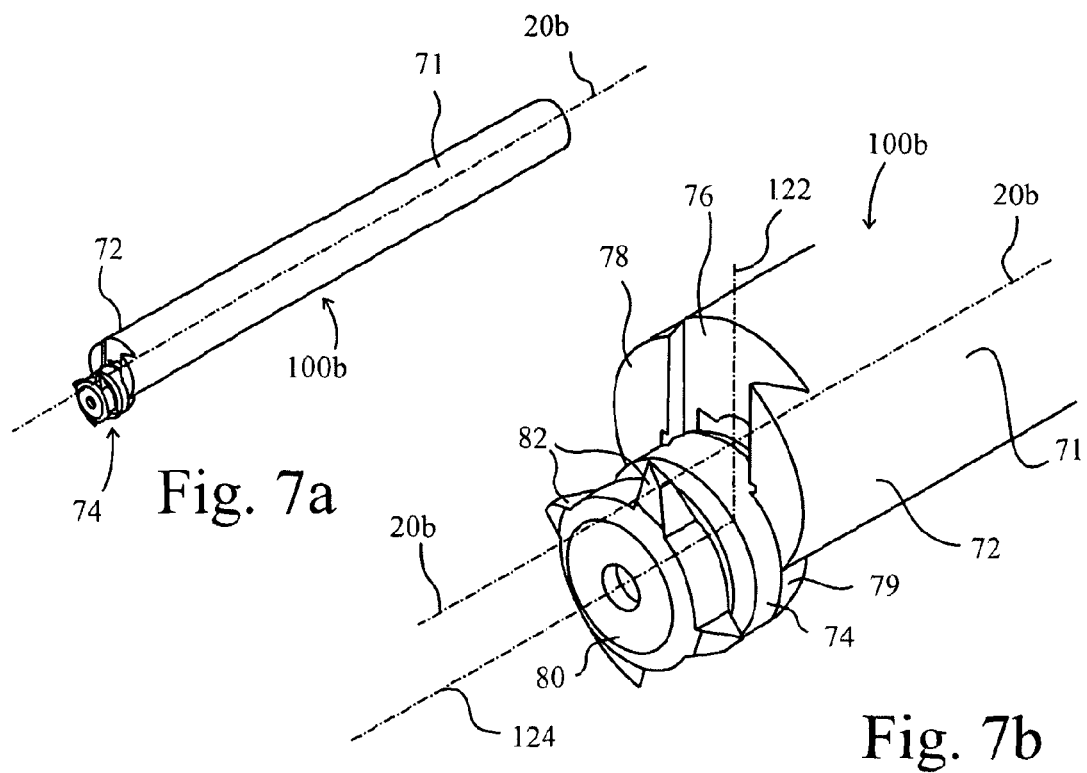
Fig. 7a
Fig. 7b
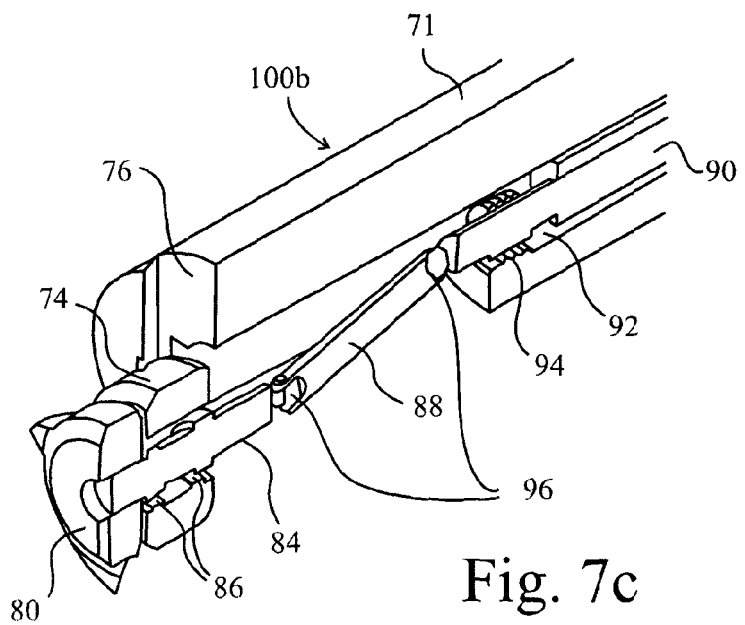
Fig. 7c

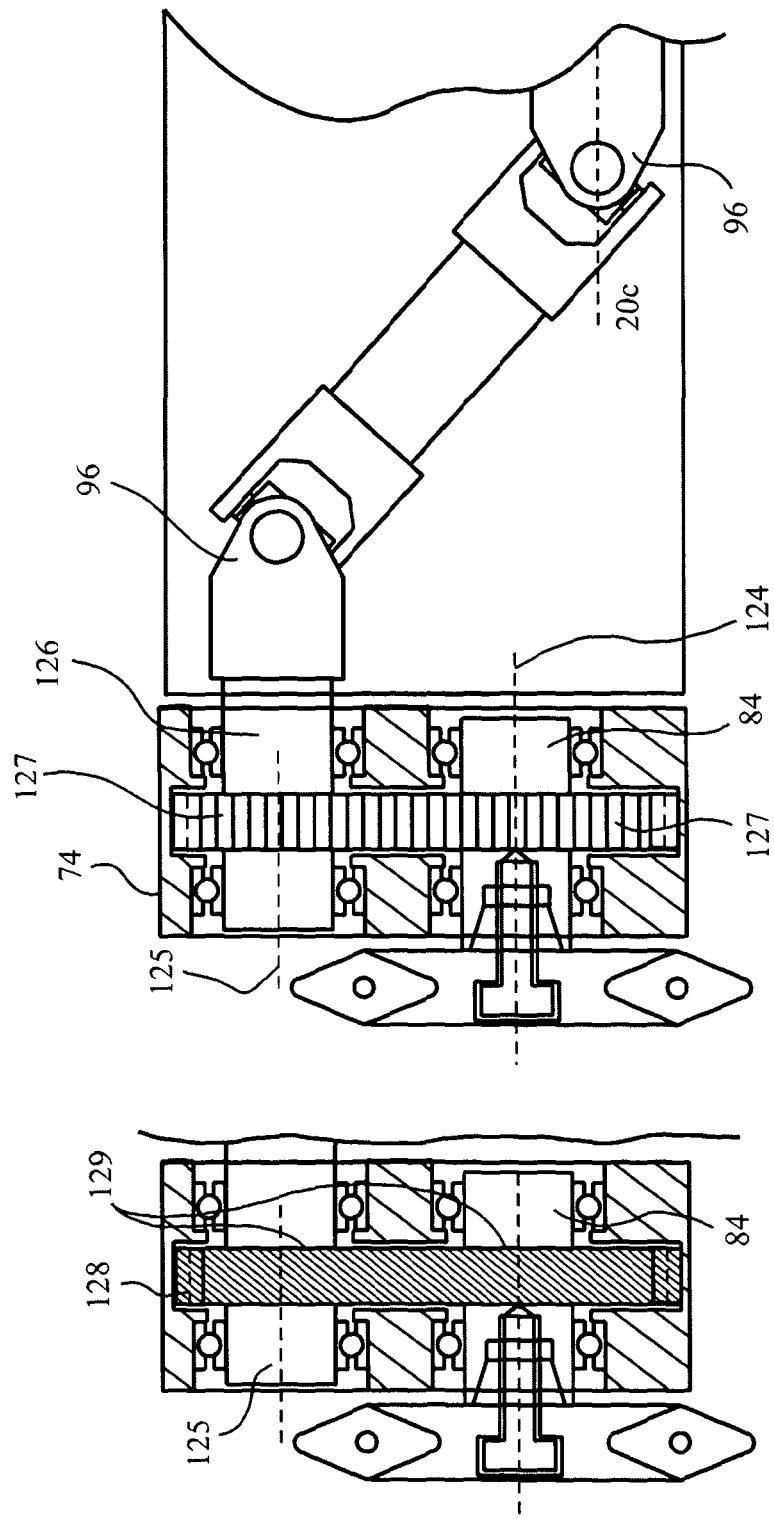

STATOR MANUFACTURING METHOD AND WHIRLING CUTTER DEVICE

CROSS REFERENCE TO RELATED APPLICATIONS

This application is a 35 U.S.C. §371 national stage application of PCT/GB2011/050200 filed Feb. 4, 2011, which claims the benefit of British Patent Application No. 1001836.4 filed Feb. 4, 2010, both of which are incorporated herein by reference in their entireties for all purposes.

STATEMENT REGARDING FEDERALLY SPONSORED RESEARCH OR DEVELOPMENT

Not applicable.

BACKGROUND

1. Field of the Invention

This invention relates to a method of machining the stators of progressive cavity pumps. However, the stator of such pumps corresponds with the stators of progressive cavity motors and therefore the invention is also applicable to such stators. The present invention finds particular application in the small size range.

2. Background of the Technology

Stators of such machines are frequently moulded from rubber or like elastomer, where a core of the mould is unscrewed from the stator bore after moulding. This is perfectly satisfactory in many respects, except there is a demand for greater performance. Indeed, the lobes of such machines absorb considerable stresses and can fracture across their root. Stators constructed from a more solid material such as steel or some composite that is not easily moulded, are feasible. Such stators may have a constant thickness rubber or elastomeric coating to provide the cushioning that is generally desirable for progressive cavity machines. Providing the bore of such stators is problematic, however.

As the skilled person will know, progressive cavity machines have an x-lobe stator and an (x−1)-lobe rotor (where x is an integer of positive value) that both orbits and rotates inside the stator. The lobes of both the stator and rotor twist along their length so that in any given rotational position of the rotor with respect to the stator there is a twisted cavity that tapers to a close at each end thereof and progresses up, or down, the stator and rotor on rotation of the rotor in the stator. Forming the bore of the stator is straightforward in some materials and at some sizes. But where it is to be cut in a hard material, and it is of a small diameter, then it poses particular problems.

Our co-pending international patent application publication number WO2008/129237 and copending international application number PCT/GB2009/051436 both describe a machining apparatus and process that is effective for large diameter stators. However, two-lobe stators, and stators of small diameter, present special problems that the apparatus disclosed in the aforementioned applications, or one working on similar principles, cannot accommodate. With a two-lobe stator, being machined using a right-angled milling tool on a body that is a sliding fit inside the bore of the tube being machined, (the bore being substantially equal to the minor diameter of the stator to be formed), the tool that finally finishes the lobe on each side of the stator must comprise a ball nose cutter whose diameter is equal to the minor diameter of the stator. This imposes a significant load on the tool and its support within the bore, such that it cannot reasonably be accomplished in material that has any substance (by that, is meant significant resistance to cutting).

Our above mentioned patent specification describes apparatus that is suitable for machining the lobes of a multi-lobe progressive cavity stator (ie one having more than two lobes). The apparatus comprises an elongate arm on which is disposed at a transverse angle a machining head to mill the cylindrical bore of a tube, the bore diameter at the commencement of milling being formed at the diameter of the minor diameter of the bore ultimately to be formed. The machining head is arranged to have steadies that support the machine head, the steadies engaging with the minor diameter that reduces as machining progresses to a helical land on the minor diameter.

The lobes are progressively machined using first a shallow cutter to produce a broad trough. As the cutter progresses into the workpiece, the workpiece is twisted so that the trough forms a helix. Then, succeedingly narrower and deeper cutters are used until a stepped profile approximating the sinusoid shape of the desired end profile is obtained. Finally, a shaped cutter having the desired profile of the trough is used. The same process is employed for each lobe.

With anything more than two lobes, there is plenty of support for the machine head, and sufficient cross section of the minor diameter to supply easily the power required to machine the lobes between the minor and major diameters. Those lobes do not, in any event, represent a significant proportion of the area enclosed by the major diameter; and nor does the difference between the major and minor diameter represent a significant proportion of the minor diameter. Accordingly, the system works well with larger diameter tools having multiple lobes. For example, consider a theoretical three lobe stator that has a bore for supporting the tool on in a circle that is the minor diameter. The lobes to be machined can be thought of in terms of an equilateral triangle whose sides are tangents to the minor diameter circle. Thus the lobes to be cut are the triangular tips of that triangle and it can be seen that the maximum diameter of the tips is at 0.86R, where R is the radius of the minor diameter. This is still a substantial proportion of the minor diameter circle but it should also be appreciated that the amount of material to be removed at this diameter is merely the side tips of said triangular tips and amount to very little material at this diameter. Consequently, the tool of our aforementioned specifications is adequate. Contrast this with the elongate rectangular (albeit with round ends) profile of a two-lobe stator, and where there is substantial material to be removed at the full width of the minor diameter.

Thus, when the diameter of the machine is reduced and the number of lobes correspondingly reduced to two, this method and tool does not perform satisfactorily. The proportion of material to be removed versus the area of the bore available to transmit power increases. Moreover, the proportional distance that the cantilever between the tool edge and its support also increases (as represented by the eccentricity of the stator bore—being the ratio of major to minor diameters). But more importantly, as described above, it is the diameter of the cutter required compared with the diameter of bore available to accommodate the tool body that defeats this method. Consequently it is an object of the present invention to develop an improved process for machining helical profiles in stator bodies of relatively small diameter. By small is meant with just two lobes and a minor diameter less than about 60 mm. However, whilst the invention is restricted to two-lobe stators, it is not actually limited to any particular diameter and could be employed in larger diameter stator bodies.

GB-A-1265743 discloses a multi-purpose milling head having a longitudinal axis and providing a rotary cutter rotatable about an axis parallel the longitudinal axis and offset by variable amounts, useful for cutting external threads on large diameters.

BRIEF SUMMARY OF THE DISCLOSURE

In accordance with the present invention, there is provided a method of machining the bore of a two-lobe stator for a progressive cavity machine, said bore having a desired profile along a longitudinal axis of the bore comprising a minor and a major diameter and an helically varying radial axis along said longitudinal axis and defining a helix pitch, said profile being defined, at any axial position along said longitudinal axis, by the area swept by a circle of diameter equal to said minor diameter being translated along said radial axis by an equal displacement amount on either side of said longitudinal axis, said method comprising the steps of:
 a) providing a tubular stator body with a cylindrical bore centred on said longitudinal axis and of diameter not less than said minor diameter, and first and second machining devices that are each a close sliding fit on said minor diameter, wherein
 b) the first device comprises a milling head on the end of a shaft, the milling head mounting a rotary cutter arranged for rotation about an axis transverse said longitudinal axis by a drive mechanism along the shaft;
 c) the second device comprises a whirling head on the end of a shaft, the whirling head mounting a whirling cutter for rotation about an axis substantially parallel said longitudinal axis but offset therefrom by a selectively variable degree between a minimal and maximal separation of the whirling cutter axis from the longitudinal axis;
 d) driving the first device through the bore so that said rotary cutter follows a helical path with said helix pitch, in the process milling a groove along said path in the stator bore using a sufficiently small diameter rotary cutter that the torque necessary to drive the cutter remains within the capacity of the drive mechanism;
 e) angularly offsetting the rotation axis of the rotary cutter of the first device with respect to the radial axis and again driving the first device through the bore along said helical path, milling a further helical groove in the stator bore, also using a sufficiently small diameter rotary cutter that the torque necessary to drive the cutter remains within the capacity of the drive mechanism;
 f) extending the depth of cut of the rotary cutter of the first device and repeating steps d) and e) without over cutting the desired profile;
 g) driving said second device through the bore so that the whirling cutter follows said helical path with the rotation axis of said whirling cutter intersecting said radial axis and cutting elements of the whirling cutter milling the stator bore to a diameter equal said minor diameter, wherein said whirling head is translated along said radial axis by said displacement amount along said longitudinal axis.

What this last step g) means is that, at the least, the whirling head is set at said displacement amount and translated along said helical path (along said longitudinal axis) so as to mill out the stator bore at each major diameter of the bore (bearing in mind it is a double helix on either side of the longitudinal axis), as well as being set at intermediate positions to mill out the stator bore at positions between the two extremes. While the "ends" of the bore in any section will be circular (or, rather, semi-circular) being as required, the lines joining the ends of the ends should be straight. Using a circular cutter tangentially to such lines inevitably will leave ridges, unless the cutter is also moved along the line. However, if this is done, there is the possibility of ridges being formed in the longitudinal direction.

Preferably, said method further includes the step of
 a) said whirling head being set at a radial displacement and driven along said helical path before being indexed to a different radial displacement and again driven along said helical path, said process being repeated until said approximate translation is complete.

Alternatively, said method further includes the step of:
 b) said whirling head being arranged to be driven along said radial axis by a radial drive while said second device is within the stator bore.

In that event, preferably,
 c) said drive is operated to drive said whirling head by said displacement amount along a radius before indexing said second device along the helical path and repeating the process until said approximate translation is complete.

Further alternatively, a combination of steps h) and j) is employed in that
 d) said whirling head is continuously driven by said displacement amount along a radius while said second device is continuously driven along said helical path, and repeating the process until said approximate translation is complete Said helical paths may be different from one another in the sense of being angularly offset and of different radii, but they are all parallel in the sense of having the same helix pitch.

Preferably, said whirling cutter has cutting elements that have V-shaped cutting faces whose points are on a circle of diameter equal to said minor diameter.

Preferably, said cylindrical bore of the stator body prior to machining is slightly greater than minor diameter to define a helical land that persists throughout the method and is employed to guide said first and second devices. Preferably, said first and second devices are each provided with steadies to bear against said helical land and support said heads.

In accordance with a further aspect of the present invention, there is provided a whirling cutter device comprising a cutter head on the end of a shaft having a longitudinal axis and a diameter thereabout, the cutter head having a journal member for mounting a whirling cutter for rotation of the cutter about an axis parallel said longitudinal axis but offset therefrom by a selectively variable degree between a minimal and maximal separation of the whirling cutter axis from said longitudinal axis, wherein the shaft has a support surface on said diameter adapted, in use, to bear against a material being cut by the whirling cutter device and wherein a helical profile in said material is capable of being cut by the whirling cutter device, said profile having a minor diameter on which said support surface is adapted to bear to support said whirling cutter.

Preferably, said cutter head is mounted on an end face of said shaft, said face being perpendicular said longitudinal axis.

Preferably, said end face has a groove and said cutter head has a flange for reception in said groove, means enabling fixing of said head in said groove in different positions thereof along the groove. Furthermore said groove and flange are dove-tailed.

According to a preferred embodiment of the present invention, said journal member is driven by a drive member mounted for rotation in said shaft, a pair of universal joints separated by a displacement member enabling offsetting of the axis of rotation of the whirling cutter. Preferably wherein said drive between the drive member and the journal member is via an intermediate member disposed in the cutter head, and said drive intermediate member is a gear meshing with a gear on said journal member. Preferably, said drive intermediate member is a pulley driving a belt wound around a pulley on said journal member.

In an alternative embodiment, said journal member is driven by a motor mounted on the end of the shaft, and preferably the motor is a hydraulic motor comprising first and second meshing gears located in a cavity supplied with hydraulic fluid, one of said gears being said journal member.

In accordance with all embodiments of the present invention, the whirling cutter is preferably mounted in a recess of an overarm attachment, attached to said end face of said shaft, and preferably said recess has a first side and a second side perpendicular to said axis of rotation of said cutter. Said attachment is preferably one of several attachments providing different one of said offset position.

In a further embodiment, the diameter of the cutting path of the cutter is substantially equal to the diameter of the shaft.

In accordance with a further aspect of the present invention, there is provided a method of machining the bore of a lobed stator comprising the steps of:
  providing the stator with a bore having a minor diameter;
  providing a whirling cutter device, which device comprises
    a cutter head on the end of a shaft having a longitudinal axis and a diameter thereabout, the cutter head having a journal member for mounting a whirling cutter for rotation of the cutter about an axis parallel said longitudinal axis but offset therefrom by a selectively variable degree between a minimal and maximal separation of the whirling cutter axis from said longitudinal axis, and wherein the shaft has a support surface on said diameter;
  passing the device through the bore so that the whirling cutter cuts the bore and simultaneously rotating the stator with respect to the device so that the bore cut is helical; and supporting the shaft on the minor diameter of the bore during step c).

Preferably the method is repeated at a different rotational start position of the whirling cutter device with respect to the stator, whereby a plurality of lobes is cut.

In a preferred embodiment, the method is repeated at different offsets of the whirling cutter.

In accordance with a method as described above, a whirling cutter device is preferably employed.

Offsetting the drive member in the way described above reduces the requisite angle of deflection of the universal joints and/or the length of the displacement member. Reducing the angle increases the power that can be developed. Reducing the length reduces the threshold speed above which eccentric whirling of the displacement shaft cannot be avoided.

Thus, the invention provides a means of machining the bore of a progressive cavity machine stator that does not overstretch the capacity of the machining equipment, and yet enables an accurate bore to be produced. The invention is predicated on the appreciation that the section of a two-lobe stator is as defined above, namely the area swept by a circle of diameter equal to the minor diameter translated along the radius of the longitudinal axis by a displacement amount that is equal, in practice, to the diameter of the eccentric orbit of the single helix rotor in the stator during use. Given this profile at any longitudinal position, a rotary cutter of diameter equal to the minor diameter and in the plane perpendicular to the longitudinal axis of the machine will machine the wall of the bore to precisely the correct shape if translated in said plane back and forth along said radius, across the centre.

In the alternative mentioned above where the second device is driven through the stator body and the whirling head is then indexed to a different radial position, the precision of the final profile depends on the size of the index step. The final step takes the cutter to the position in which it cuts an entire one-half of a circle at the maximum offset. However, between the middle of the stator body (where it cuts nothing given that the starting bore is not less than the desired minor diameter of finished stator bore) and the maximum offset, there will be shallow ridges between each index step. However, as an example, for a stator of 27 mm minor diameter and 45 mm major diameter with six steps of approximately 3 mm results in a ridge between each step of about 0.05 mm height, which is perfectly adequate precision for most purposes.

BRIEF DESCRIPTION OF THE DRAWINGS

Embodiments of the invention are further described hereinafter with reference to the accompanying drawings, in which:

FIGS. 1a and b are a side section and a cross section of a two lobe stator to which the present invention relates, FIG. 1a being a section on the line A-A in FIG. 1b;

FIG. 2 is a section showing the profile of the stator at any given point along its length;

FIG. 5 is a section similar to FIG. 2 showing the profile after the first stage of machining is completed;

FIGS. 6a to d are perspective views of: the whole tool; the whole tool in side section; a transparent view; and a detailed view of the end of a tool for performing first stage machining operations;

FIGS. 7a to d are respectively: a perspective view of the whole tool; a perspective view of the end of the tool; a perspective view of the end in section; and a perspective view of a section of the end in a different position to that shown in FIG. 7c; all of a second tool according to an aspect of the present invention and for performing second stage machining operations;

FIG. 11 is a side section of the apparatus in FIG. 10 when configured to make shallow cuts.

FIG. 12 is a side section according to an embodiment of the second tool showing the cutter head, in which a belt drive is employed;

DETAILED DESCRIPTION

Figure 3:
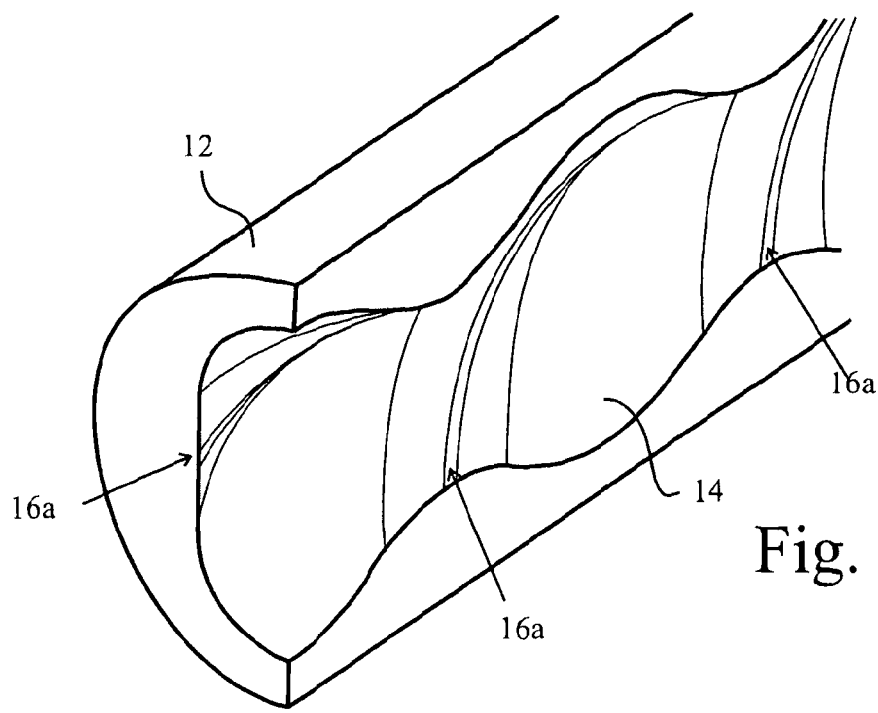
FIG. 3 is a perspective side section of the stator after formation using the method of the present invention.

In the drawings, a stator 10 comprises a body 12 in the form of a tube having a bore 14. The bore 14 is a double helix whose profile at any position along a longitudinal axis 20, which is central to the bore 14 is an oval shape that is swept by a circle of radius $R_1$ translating from centre $C_0$ coincident with the longitudinal axis 20 to two further centres $C_1$, $C_2$. The distance $C_1$, or $C_2$, to $C_0$, is the eccentricity of the stator. Thus, starting with a tube having a central circular bore 16 of diameter $R_1$, at any axial position along the axis 20, C shaped segments 22,24 (hatched areas in FIG. 2) must be removed. However, the radial axis 30 of the bore 14 rotates as the profile progresses along the stator 10 so that, when viewed from one end as shown in FIG. 1b, there is only a circular bore visible, equal to the original bore 16 of the body 12. However, as mentioned above, the bore 14 is not circular but a double helix of pitch P, as shown in FIG. 1a. The diameter $R_1$ is referred to as the minor diameter, whereas the full width of the bore 14, which is equal to the sum of the minor diameter $R_1$ plus the separation of the centre's $C_1$, $C_2$, and this is referred to as the major diameter $R_2$. The profile of each end 14a,14b (see FIG. 2) of the bore 14 is semicircular, with the sides 14c,d being parallel straight lines that are tangential to the ends 14a,14b.

For reasons explained further below, the starting bore 16 of the stator body 12 is actually slightly larger than the minor diameter $R_1$ Accordingly, when the machining operation to be described below is complete, a land 16a results, as shown schematically in FIG. 3. The land 16a (which is flat in the longitudinal direction but circular in the circumferential direction with respect to the longitudinal axis 20) provides a bearing surface for the tools used to form the bore 14. The lands 16a both guide the tools and provide reaction surfaces for the forces exerted during machining.

Turning to FIGS. 6a to d, an example of a tool, schematically illustrated, suitable for performing the first stage of machining is illustrated. It is to be understood that the machine employed is of the type described in WO2008/129237 referred to above, the entire contents of which are included herein by reference. By "type" is meant simply a tool with an angled—preferably right-angled—milling head). With specific reference to FIGS. 6a to d, the tool here exemplified comprises a cylindrical body 40 which formed in two halves 40a,b. The halves 40a,b are clam shells, and enclose an endless belt 42 that, at one end, is wound around a drive pulley 44 and, at the other, working end, is wound around a pulley 46 that is disposed in bearings 48 in a head 50 of the tool 100a.

Mounted in a bore 52 of the pulley 46 is a tool holder (not shown) in which a variety of milling tools (also not shown) can be fixed. By rotating the drive pulley 44, the tools rotate about an axis 120 which is perpendicular to the longitudinal axis 20a of the tool 100a. In use, the tool 100a is inserted into the cylindrical bore 16 of the stator body 10 until the head 50 extends beyond the end of the stator body 12. A tool is then fixed in the bore 52 (or in the holder if the holder does not extend beyond the diameter of the bore 16). The tool body 40 is a close sliding fit in the bore 16. The stator 10 is firmly held in a jig (not shown) and, while various options are possible, the preferred arrangement is that the tool 100a is driven so that the milling tool in the head is rotated and the tool 100a is slowly withdrawn back through the stator body 12 along the longitudinal axis 20 milling a groove on the bore 16. At the same time, the jig holding the stator body 12 arranges for the body 12 to rotate gradually about its longitudinal axis 20 so that it makes one complete revolution in the distance that the tool 100a moves the distance P. Thus the groove machined is helical, employing a combination of chuck rotation and linear movement of the tool.

Figure 4:
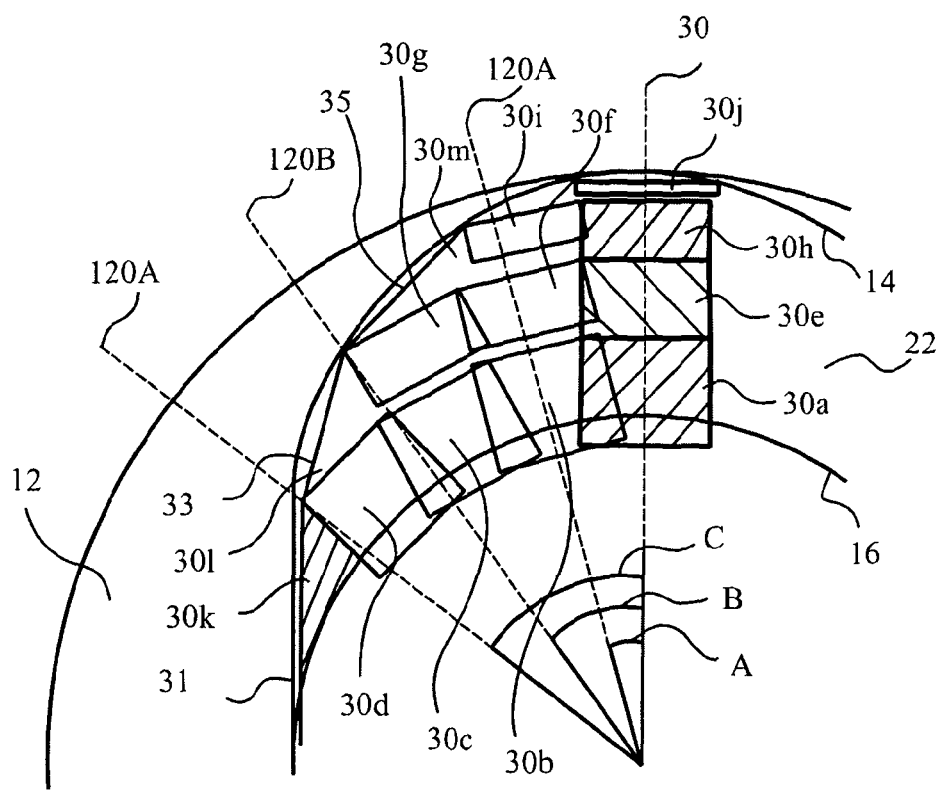
FIG. 4 is a section similar to FIG. 2, but showing the first stage machining paths.
Figure 7D:
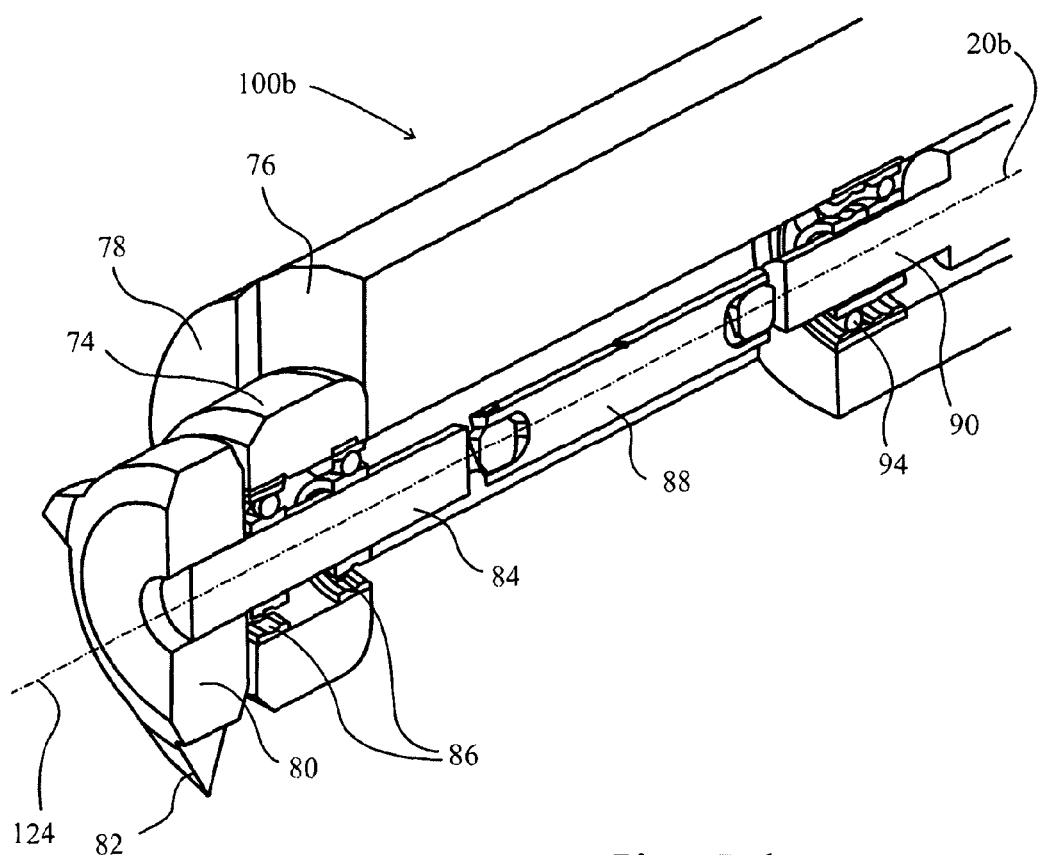

Turning to FIG. 4, the first pass of the tool 100a results in a channel 30a being removed. For this, a tool bit is employed having the dimensions of the groove 30a and in which the axis 120 of the tool 100a is aligned with the axis 30 of the major diameter of the bore 14 to be formed. When completed, the tool bit is removed and the tool 100a reinserted into the stator body 12. Then, the tool 100a (or, more likely, the stator body 12) is indexed through an angle A so as to offset the axis 120A. The same tool bit is then employed to machine a further groove 30b, overlapping the groove 30a, and removing more of the segment 22 to be machined away. This process is repeated with two further indexing steps and machining passes removing areas 30c and 30d respectively. When completed, and the tool 100a reinserted again into the bore 16 a new tool bit (not shown) is attached that has a longer reach and is arranged to remove further material 30e. Two further passes remove areas 30f and 30g.

The tool is then further extended to remove areas 30h and 30i before a final, longest reach tool, removes a shallow rectangular section area 30j. (In fact, in practice, the procedure will most likely also involves machining the right-hand quadrant of the area 22, as well as the opposite segment 24. This avoids having to change the bit too often.)

Next, three angled cutters are applied on the offsets at angles A, B and C (along axes 120A,B,C) the angled cutters having flanks 35, 33 and 31 respectively to remove triangular regions 30m, 30l and 30k respectively. Thus, a total of 22 passes are made removing the majority of the area 22 and leaving the profile 16b shown in FIG. 5. Given that the amount of material removed with each pass is very small, the tool 100a is quite sufficient in its structural capacity to effect the cutting operations in question.

However, the bore 16b is certainly not ready for use. Accordingly, the invention proposes to employ a second tool of which the tool 100b shown in FIGS. 7a to d is an example. Whereas the tool 100a might be regarded as a traditional milling tool, having a rotary cutter on an axis 120 transverse to the longitudinal axis of the tool, the tool 100b is best described as a "whirling tool" having a rotary cutting tool 80, also referred to as a whirling cutter, at one end 72 of a body or shaft 71 of the tool. The cutter 80 is mounted on a journal member 84 rotationally mounted within a cutter head 74 that is a sliding fit in a dovetail slot 76 formed in an end face 78 of the tool 100b. The cutter head 74 is correspondingly dovetailed at 79 to be a sliding fit in the slot 76. However, means (not shown) are provided to lock the cutter head 74 in any selected position within the slot 76. For example, a screw might be received in the cutter head 74 that impinges on the end face 78 pulling the cutter head 74 away from the slot 76 and tightly wedging the dovetail flange 79 with the slot 76. Other means of locking the cutter head 74 to the end 72 may be provided.

The cutting tool 80 that has a plurality of cutting bits 82, which preferably are V-shaped in profile and set on a circle of diameter equal to the minor diameter $C_0$ and in a plane orthogonal to the longitudinal axis 20b of the tool 100b.

With reference to FIG. 7c, the cutting tool 80 is mounted on the end of the journal member 84 received in bearings 86 in the cutter head 74. The journal member 84 is driven by an intermediate (displacement) shaft 88 which is itself driven by a drive member 90 that extends through a bore 92 through the body/shaft 71. The drive member 90 is mounted in bearings 94 at each end of the bore 92. Between the intermediate shaft 88 and the journal member 84 and drive member 90 are a pair of universal joints 96 that enable drive from the shaft 90 to be maintained to the cutting tool 80 regardless of the lateral offset position of the cutter head 74 within the slot 76. Preferably, the intermediate shaft 88 is adjustable in length and may comprise, for instance, telescoping splined elements (not shown in detail).

Referring to FIG. 7b, the slot 76 has an axis 122 that is transverse to the longitudinal axis 20b of the tool 100b and is, in fact, perpendicular thereto. Axis 124 of the journal member 84 is likewise perpendicular to the axis 122. Axis 122 is the direction of movement of the cutter head 74 in the slot 76. Axis 124 is, therefore, and remains, parallel to the longitudinal axis 20b of the tool 100b.

Figure 8A:
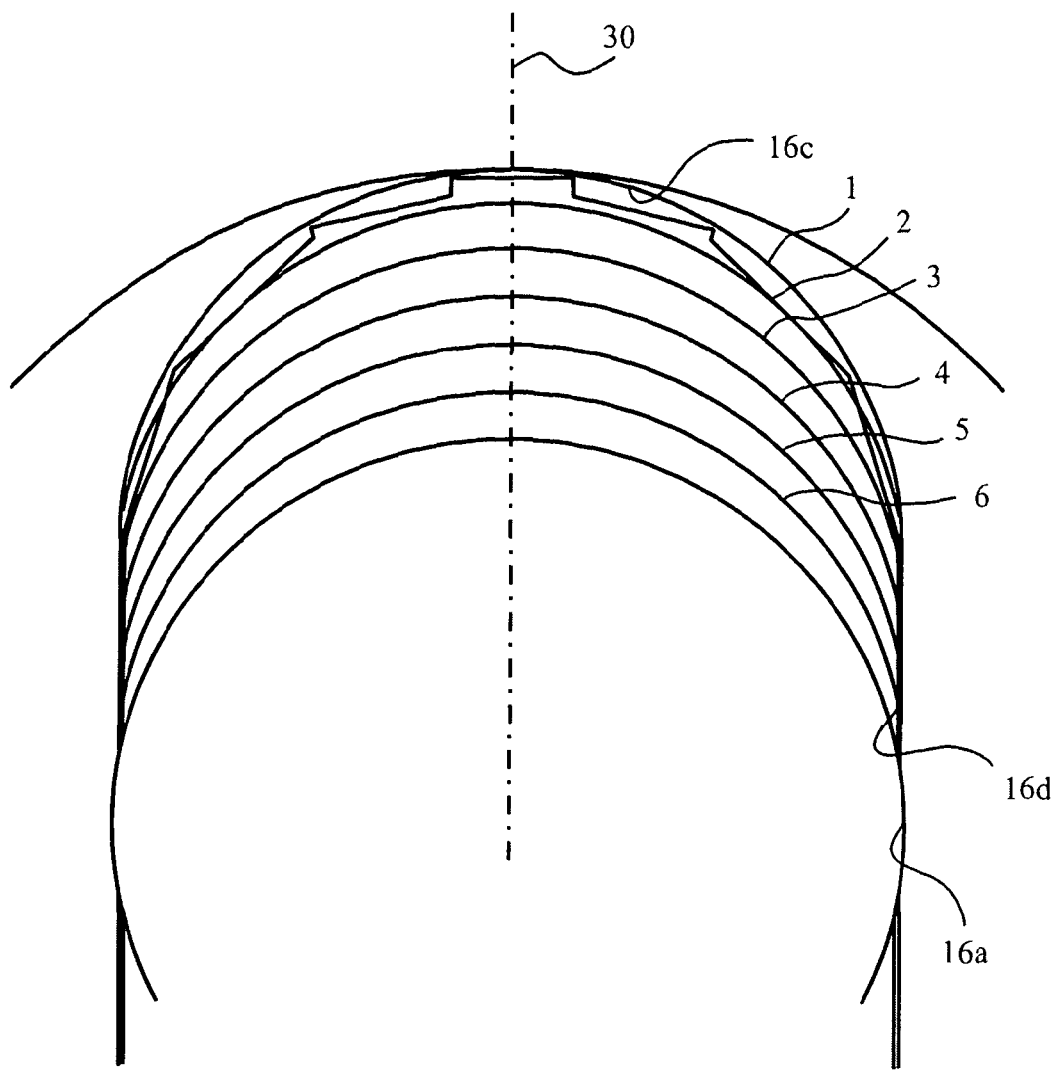
FIGS. 8a and b are sections, a) as per FIG. 5, but showing the machining operations using the tool of FIG. 7, and b) the resulting side of the profile (in enlarged detail)

Turning to FIG. 8a, the passes made of the tool 100b through the bore 16b (of FIG. 5) are shown. First of all, the cutter head 74 is aligned with the body 71 of the tool 100b and the tool is passed through the stator 12, the body 71 again being a close sliding fit on the lands 16a. When the cutter head 74 extends through the open end of the stator body 12, the locking means (not shown) are released and the cutter head 74 displaced transversely along the axis 122 to a maximum displacement from the longitudinal axis 20b, which is here coincident with the axis 20 of the stator 12. The displacement is in the amount of half the distance between the centers $C_1$, $C_2$ described above with reference to FIG. 2. When drive shaft 90 is operated to spin the cutting tool 80, the circular profile 16c of the end 14b of the major diameter of the bore 14 is formed. Again, the tool 100b is withdrawn through the bore of the stator 12, the stator being simultaneously rotated at the appropriate rate.

Indeed, with both the milling tool 100a and the whirling tool 100b, the cutting heads all describe a helical path in their passage through the stator 12, which helical path is identical on every occasion in the sense that all the helical paths followed are parallel to one another and therefore have the same pitch P. However, each helical path may be displaced with respect to another one both radially and angularly with respect to each other, and, of course, two major paths are followed being angularly offset by 180° from one another.

Figure 8B:
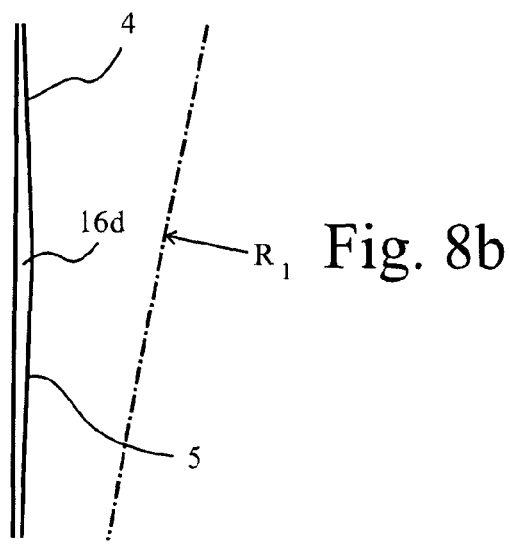

Thus, further passes are made with the tool 100b (it being returned to the inline position for reinsertion in the stator 12), and the passes are shown as circles 1 to 6 in FIG. 8a. These passes are intended to clean up the side 16d of the bore 16 to form the sides 14c,d of the stator, but, as can be seen in FIG. 8b, the side 16d will comprise a series of ridges defined by the overlapping passes, for example as between passes 4 and 5 in FIG. 8b. However, the size of the ridge can be minimized by increasing the number of passes and, for most practical purposes, six is sufficient. Indeed, in one example, with a minor diameter of 27 mm and a major diameter of 45 mm, and six steps each of approximately 3 mm separation between them, the height of the ridge 16d in each case is only about 0.05 mm, which is not sufficient to interfere with proper operation of the stator when in use as a pump or motor stator. The order of the passes does not necessarily follow the order of numbers 1 to 6 (or, in fact the order 6 to 1) and it may be that a different order is more efficient. For example, cutting in the order 3, 2, 1, 4, 5, 6 may be preferred for the reason that this maintains the profile 16a of the original bore on the minor diameter for the longest possible time, and so that the shaft 71 can be a close sliding fit therein and provide support for the cutter 80 during its cutting operations. Moreover, when a given pass is completed, for example, pass 3, it would be most convenient to effect the same pass (3) with the same tool in the other lobe or lobes of the stator before changing the cutter to make a different pass (eg 2, or 4).

Figure 9:
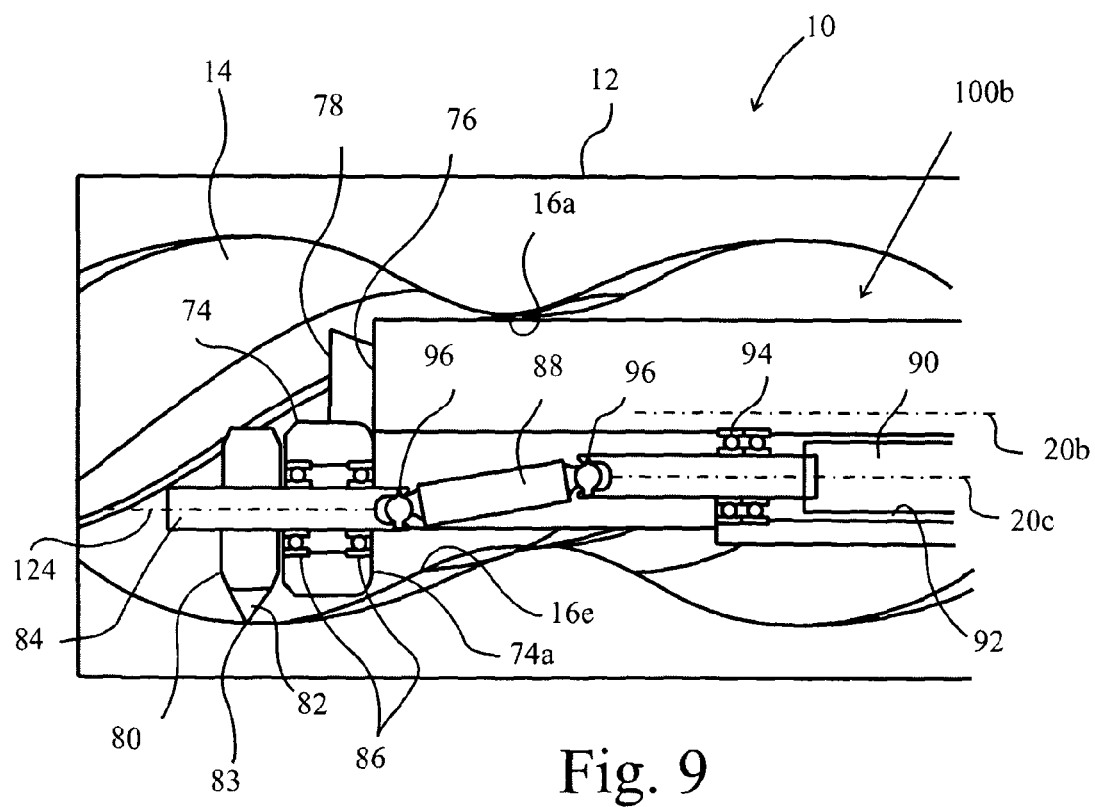
FIG. 9 is a side section of the tool of FIG. 7 in use.

Turning to FIG. 9, the position of the tool 100b when it is at maximum displacement and is cutting pass 1 (in FIG. 8a) is shown within the stator body 12. From this, it can be seen that the cutter head 74 needs to be chamfered at 74a in order to avoid collision with the flank 16e of the bore 14 as it twists behind the cutter head 74. Indeed, the shaft 90 can clearly be seen to be on an axis 20c that is displaced with respect to the axis 20b of the tool 100b. The purpose of this is to minimize the angular deflection of the universal joints 96 when at the maximum deflection of the cutter head 74. It is at this position that the tool is doing most of its cutting of the bore 16c and consequently requires most power to be provided to it. It is well known that universal joints at a large displacement angle absorb substantial power. While it would be feasible to increase the length of the displacement shaft 88, this would only serve to restrict the maximum speed (and thus power) capable of being delivered (all other things being equal) since the whirling threshold is directly linked to the length of this shaft.

However, the result of the displacement of the bore 92 and consequent displacement of the drive member 90 is that, in order to have the cutting head 74 aligned with the longitudinal axis 20b, (that is, the axis 124 coincident with the axis 20b) the intermediate shaft 88 is actually tilted upwardly. Thus, referring back to FIG. 7d, where the axis 124 is shown coincident with the axis 20c of the drive member 90, (that is, with the shafts 84, 88 and 90 all being coincident), the cutting tool 80 is actually positioned to effect pass 4 or 5.

In FIG. 9, the shaft 71 is shown contacting the bore 16a opposite where the cutter tip 83 is engaging the bore 16. Of course, although support is best provided directly opposite the reaction site of the tool and where it is impinging the material being cut, firstly these sites are in several rotational positions about the journal member axis 124, and not just in the plane of the drawing in FIG. 9, and secondly, the support is around the entire perimeter of the shaft 71, although in a helix down its length.

Figure 10:
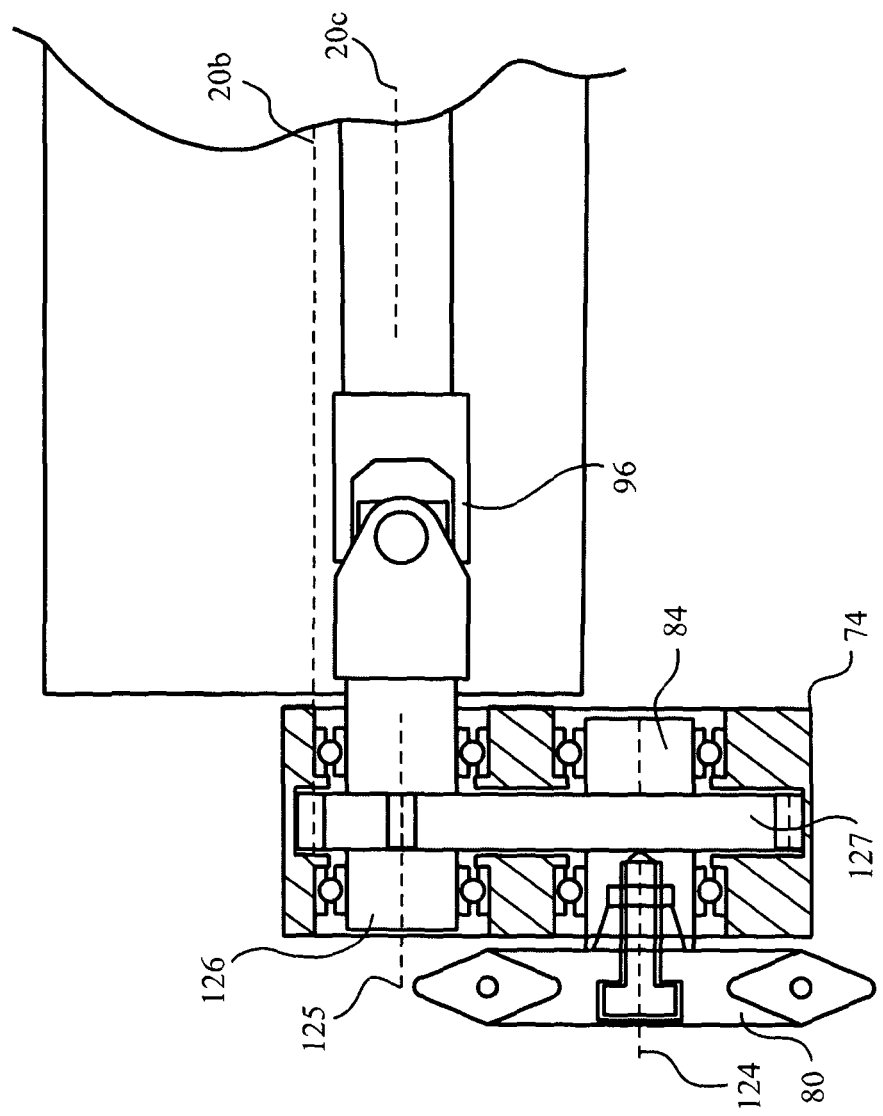
FIG. 10 is a side section according to a different embodiment of the second tool, in which the whirling cutter is configured to make deep cuts.

FIG. 10 shows an embodiment of the invention wherein the cutter head 74 is configured to have a drive member 126 driving the journal member 84 therein in a different manner to that described with reference to FIGS. 7a to d. Here the drive member 126 has a gear 126a about an axis 125 which is parallel to said longitudinal axis 20b. The gear 126a drives a corresponding gear 127 on the journal member 84. This allows for a large offset of the cutter rotation axis 124 from the drive axis 20c whilst retaining the power which could be lost by having a large step between the drive 90 and the journal member 84 as shown in FIG. 9. However, in FIG. 11, a large deflection in intermediate shaft 88 can be seen, but here the cutter 80 is at its minimum offset, ready for passes 4, 5 and 6, at which little material is removed so the loss of power through the large deflection is not an issue.

In the preferred embodiment, the drive member 126 is connected to the journal member 84 by the gear means as described above. FIGS. 10 and 11 shows the connection between the journal member 84 and the drive member 126, made using geared wheels 127. The geared wheels 127 are selected to achieve effective power transfer between the members 84,126 whilst locating inside the cutter head 74. However, FIG. 12 shows an alternative in which the connection is made by a belt 128 drive. The belt 128 is located on pulley wheels 129 attached to the drive 126 and whirling 84 members.

Figures 13A, 13B:
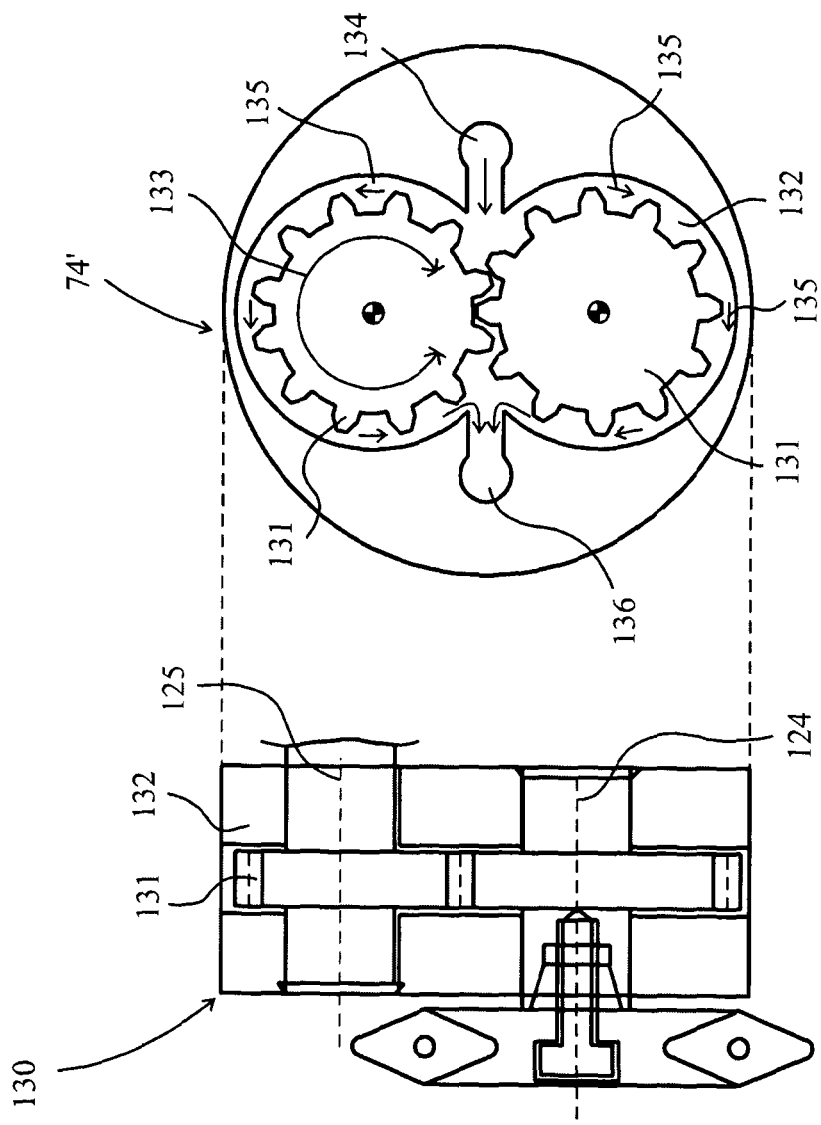
FIGS. 13a and b are respectively a side section according to an embodiment of the second tool showing the cutter head arranged as a hydraulic motor, and a cross section.

FIGS. 13a and 13b shows the drive 126 and journal members 84 configured as part of a hydraulic motor apparatus 130 disposed in the head 74'. Here, the members are arranged with geared wheels 131 which mesh within an oil filled cavity 132. The non-meshing circumference 133 of the geared wheels 131 is exposed to an oil pressure such that oil pumped into a hole 134 in the first side of the apparatus, moves 135 around the non-meshing circumference of the geared wheels 131 to escape from a second hole 136 located at the other side of the apparatus. The movement of the oil around the non-meshing circumference 133 of the geared wheels 131 causes the members to rotate.

Figure 14:
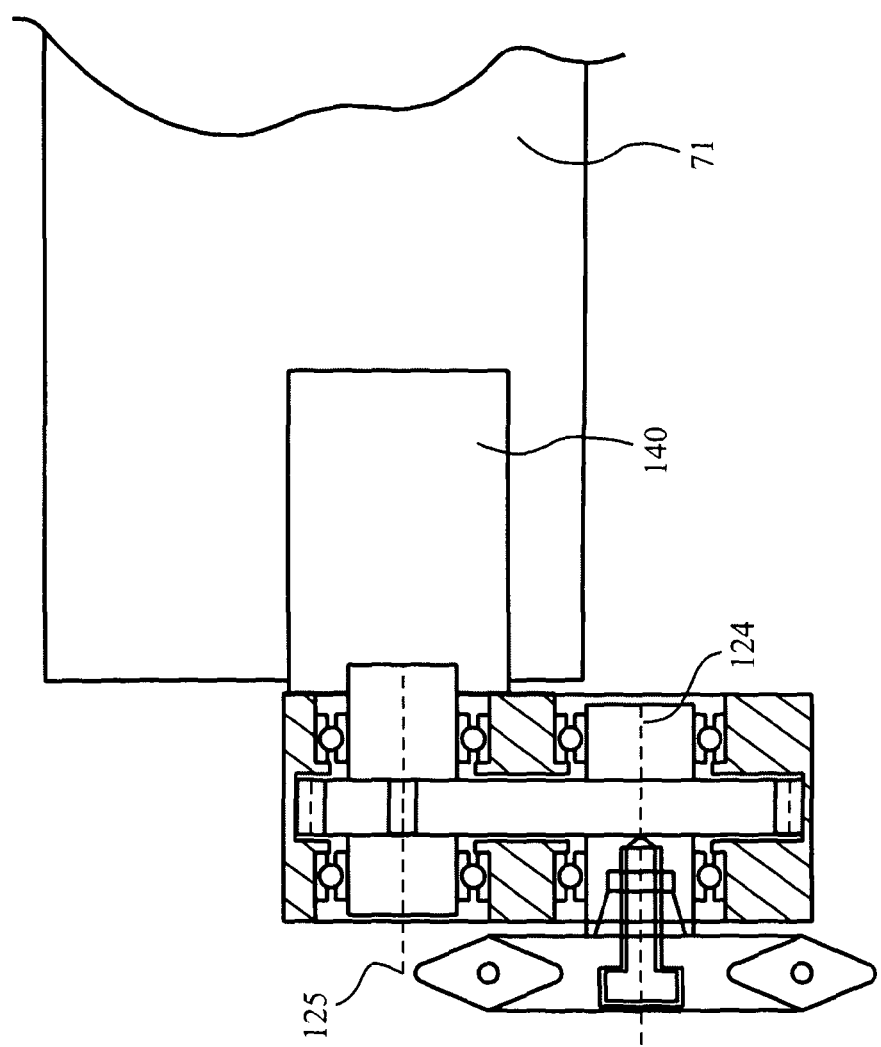
FIG. 14 is a side section according to an embodiment of the second tool, in which driving means is located inside the shaft of the tool.

FIG. 14 shows an embodiment of the invention wherein driving means 140 is connected directly to the drive member 126 of the cutter head 74. This has the advantage of removing the power loss associated with the transfer of the drive shown in FIG. 11 for example. The driving means could be a hydraulic motor, or indeed any other motor that is small enough to locate within the shaft 71.

Figure 15:
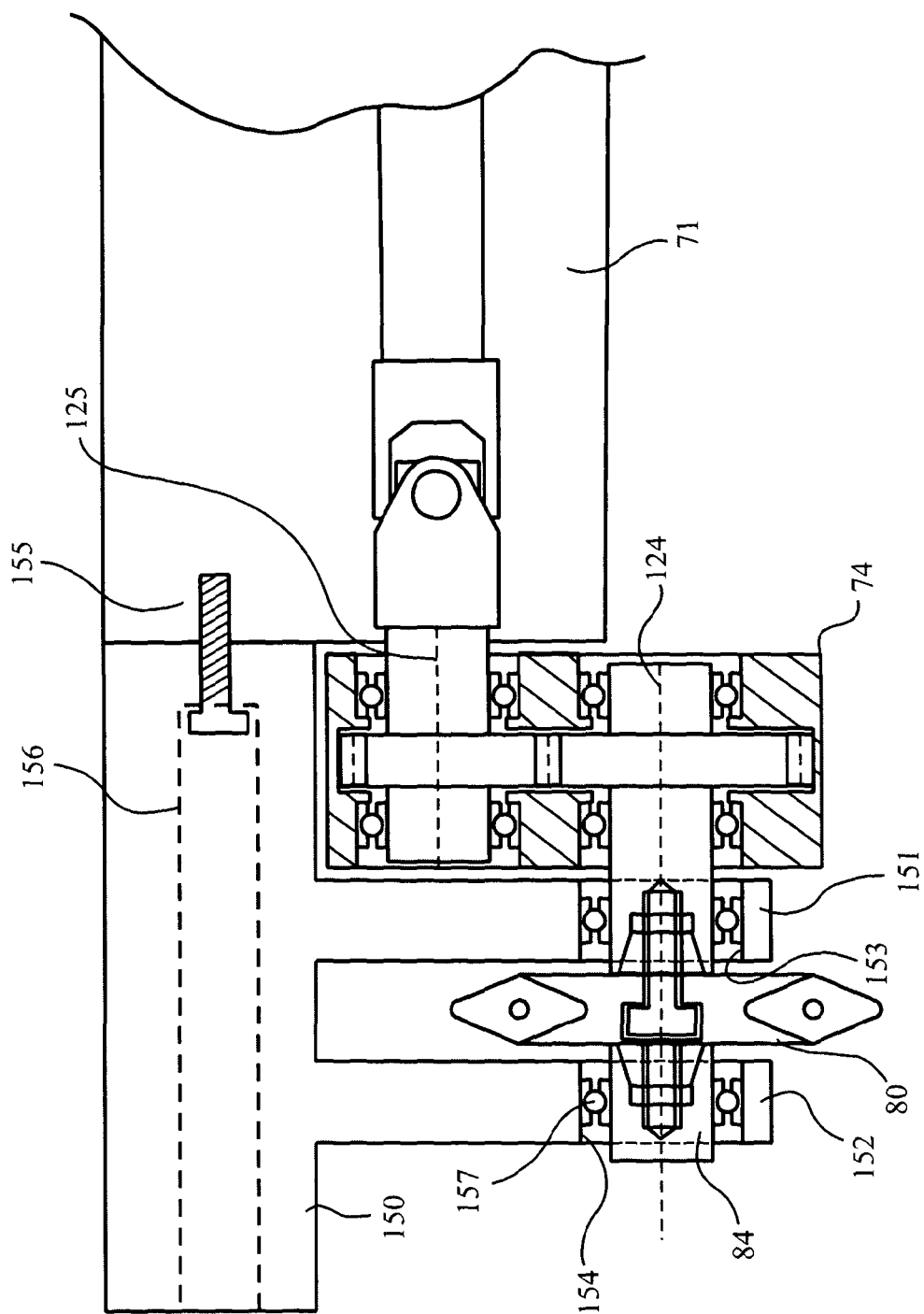
FIG. 15 is a side section according to an embodiment showing an overarm attachment.
Figure 16:
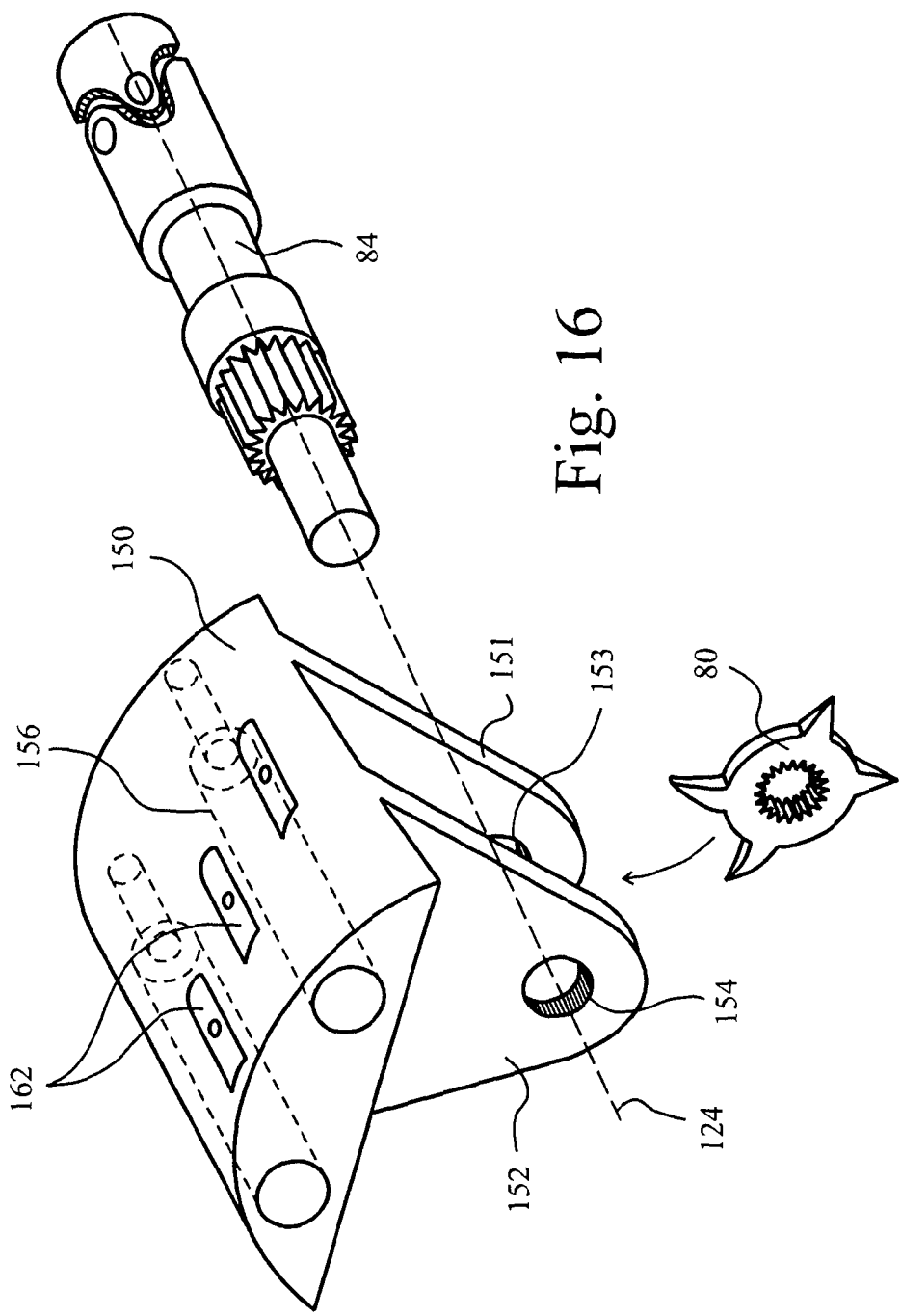
FIG. 16 is a perspective view of the overarm attachment of FIG. 15.
Figure 17:
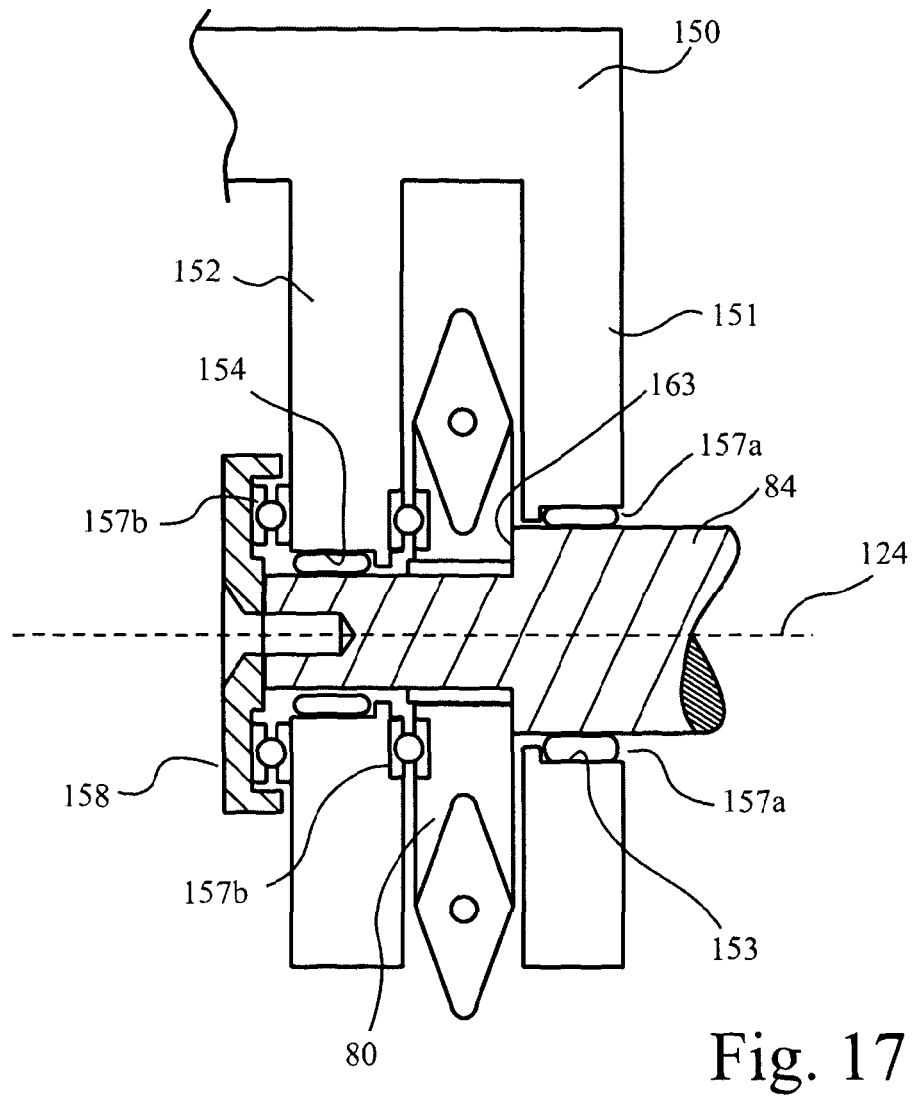
FIG. 17 is a side section showing an alternative arrangement of the overarm attachment.

FIGS. 15 to 17 show the invention with an overarm attachment 150 in place. The overarm 150 serves to improve the rigidity of the device when it is configured to cut substantially off axis such as is shown in FIG. 15. The overarm 150 is made of a material similar to or the same as that of the shaft and has two arms 151,152 which are separated by a gap in which the cutter is disposed. The arms have holes 153,154 to receive the journal member 84 on bearings 157. The overarm is attached to the shaft 71 by bolts 155 located in bores 156. During attachment, the journal member 84 is passed through one hole 153 in the first arm 151 of the overarm 150, then through the cutter 80 and finally through the hole 154 in the second arm 152 of the overarm 150. In this embodiment, various overarm attachments would be required, each having holes with centers that configure the offset of the cutting axis from the longitudinal axis of the shaft at chosen values. The holes in the overarm 150 may be of the same or different diameter.

However, in the embodiment shown in FIG. 17, the hole 153 in the first arm 151 is shown to be larger than that in the second. This has the purpose of allowing for the journal member 84 to be shaped such that it can pass through the first hole 153 and seat comfortably in the second hole 154. Needle roller bearings 157a, placed in the holes 153,154, enable smooth rotation of the journal member 84 and provide support against the significant radial loads imposed by the cutter. An end cap 158 attaches to the end of said journal member 84 capturing the cutter 80, thrust bearings 157b and limb 152 of the overarm attachment 150, against a shoulder 163 of the member 84.

The overarm arrangements of FIGS. 15, 16 and 17 are only feasible with the large offsets of passes 1, 2 and 3 (FIG. 8a). However, when passes 4, 5 and 6 are to be made, the arrangement is as described above with reference to FIG. 11 because then there is insufficient width above to dispose the overarm. The overarm has two effects, however. The first is that it provides better support for the cutter 80, which is cantilevered in the arrangement of FIGS. 10 to 14, whereas it is supported on either side with the over arm. Secondly, by extending forwardly as it does, the overarm having pads 162 can bear against an be supported on the minor diameter bore 16a in front of the cutter 80. Both these features assist accurate and secure cutting, and precisely when it is most needed in performing pass 1, 2 and 3. However, when performing passes 4, 5 and 6, as already mentioned above, not so much material is removed and therefore the additional support of the overarm is not so desirable.

It is to be noted that journal members 84 of FIGS. 15 and 16 are different in another respect; namely that while the arrangement of FIG. 15 is a stepped head 74 substantially as shown in FIGS. 10 and 11, in FIG. 16 the journal member 84 is as described with reference to FIGS. 7a to d. Either arrangement is possible.

While the cutters 82 are shown with a sharp V-shaped point 83, it is likely that, for best results, the point 83 will actually have a small flat, so that adequate longitudinal progress can be made without leaving circumferential grooves in the face of the bore 14.

Finally, as described above, the cutting head 74 is indexed between different positions and fixed during each pass through the stator body 12. However, an alternative is feasible, which is to provide a drive that moves the cutting head 74 through the different positions illustrated by passes 1 to 6 in FIG. 8a as the tool progresses through the stator 12. Several passes could be made through the tool so as to substantially eliminate the ridges 16d. How the cutting head 74 might be moved is within the skill of the person familiar with the art of tool making.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for machining a helical bore of a two-lobe stator for a progressive cavity machine, said helical bore having a longitudinal axis, a desired profile along the longitudinal axis, a minor diameter, a major diameter, and a helically varying radial axis along said longitudinal axis defining a helix pitch, said profile being defined, at any axial position along said longitudinal axis, by the area swept by a circle of diameter equal to said minor diameter being translated along said radial axis by an equal displacement amount on either side of said longitudinal axis, said method comprising:

a) providing a tubular stator body with a cylindrical bore centred on said longitudinal axis and having a diameter not less than said minor diameter, a first machining device, and a second machining device, each machining device sized to slidingly engage the stator body along said minor diameter;

wherein the first machining device comprises a milling head coupled to an end of a shaft, the milling head mounting a rotary cutter arranged for rotation about a first axis transverse to said longitudinal axis by a drive mechanism; and wherein the second machining device comprises a cutting head coupled to an end of a shaft, the cutting head comprising a journal member for mounting a whirling cutter for rotation about a second axis substantially parallel to said longitudinal axis but radially offset therefrom by a selectively variable degree between a minimal and maximal separation of the second axis from the longitudinal axis; and wherein the shaft of the second machining device has an outer diameter that is substantially the same as the minor diameter of the bore, and wherein the whirling cutter is configured to cut to a diameter measured perpendicular to the second axis is substantially equal to the outer diameter of the shaft of the second machining device;

b) driving the first machining device through the bore so that said rotary cutter follows a helical path with said helix pitch;

c) milling a first helical groove along said helical path in the stator body during b);

d) angularly offsetting the first axis of the rotary cutter of the first machining device with respect to the radial axis after c);

e) driving the first machining device through the bore along said helical path after d);

f) milling a second helical groove in the stator body during e);

g) increasing a radial depth of cut of the rotary cutter of the first machining device and repeating b) thru f) without over cutting the desired profile;

h) driving said second machining device through the bore so that the whirling cutter follows said helical path with the second axis of said whirling cutter intersecting said radial axis;

i) milling the stator bore to a diameter equal to said minor diameter with a plurality of cutting elements extending from the cutting head;

j) translating the cutting head along said radial axis by said displacement amount during h) or translating the cutting head along said radial axis by said displacement amount by incrementally indexing the whirling head prior to one or more repetitions of h).

2. The method of claim 1, wherein j) comprises:

j1) setting the cutting head at a radial displacement and driving the cutting head along said helical path;

j2) indexing the cutting head to a different radial displacement and driving the whirling head along said helical path after j1);

j3) repeating j1) and j2) to translate the cutting head along said radial axis by said displacement amount.

3. The method of claim 1, wherein j) comprises:

j1) driving said cutting head along said radial axis by a radial drive while said second machining device is within the stator bore.

4. The method of claim 3, further comprising:

j2) indexing said second machining device along the helical path after j1;

j3) repeating j1) and j2).

5. The method of claim 3, wherein said cutting head is continuously driven by said displacement amount along said radial axis while said second machining device is continuously driven along said helical path.

6. The method of claim 1, the cutting elements have V-shaped cutting faces with cutting tips disposed on a circle having a diameter equal to said minor diameter.

7. The method of claim 1, wherein said cylindrical bore of the stator body prior to machining is slightly greater than the minor diameter and defines a helical land during machining that guides said first and second machining devices.

8. The method of claim 1, wherein said first and second machining devices are each provided with steadies to bear against said helical land and support said heads.

* * * * *